United States Patent [19]
Buchwald

[11] 3,984,281
[45] Oct. 5, 1976

[54] PLATE TYPE LIQUID HEATER AND EVAPORATOR

[75] Inventor: Bernhard Buchwald, Himmelsthur, Hildesheim, Germany

[73] Assignees: Henry Balfour & Company Limited, Fife, Scotland; Eduard Ahlborn Aktiengesellschaft, Hildesheim, Germany

[22] Filed: Jan. 9, 1975

[21] Appl. No.: 539,839

[52] U.S. Cl. ............................. 159/28 P; 165/167
[51] Int. Cl.² ..................... B01D 1/00; B22D 47/02
[58] Field of Search ................. 159/28 P; 165/167

[56] References Cited
UNITED STATES PATENTS

| | | | |
|---|---|---|---|
| 2,229,306 | 1/1941 | Prestage | 165/167 |
| 2,875,986 | 3/1959 | Holm | 159/28 P |
| 3,282,334 | 11/1966 | Stahlheber | 159/28 P |
| 3,310,105 | 3/1967 | Butt | 165/166 |
| 3,399,708 | 9/1968 | Usher et al. | 159/28 P |
| 3,735,793 | 5/1973 | Burberry et al. | 159/28 P |
| 3,807,496 | 4/1974 | Stadmark | 165/167 |

FOREIGN PATENTS OR APPLICATIONS

| | | | |
|---|---|---|---|
| 57,169 | 9/1937 | Denmark | 167/ |
| 880,591 | 7/1953 | Germany | 165/167 |

*Primary Examiner*—Jack Sofer
*Attorney, Agent, or Firm*—Mason, Fenwick & Lawrence

[57] ABSTRACT

A liquid heater or plate evaporator for partially evaporating liquid from a solution within the heater to increase its concentration, including evaporator and heater plates arranged in an alternating sequence in tandem and having heating or liquid channels between adjoining plates, the plates having registering apertures for heating medium, the solution to be evaporated, condensate therefrom and for a product mixture comprising concentrated solution and vapor each evaporator plate aperture having a distributor and guides to uniformly distribute the solution across the evaporator plate and to discharge it through discharge apertures located in a lower part on either side of the plate.

6 Claims, 9 Drawing Figures

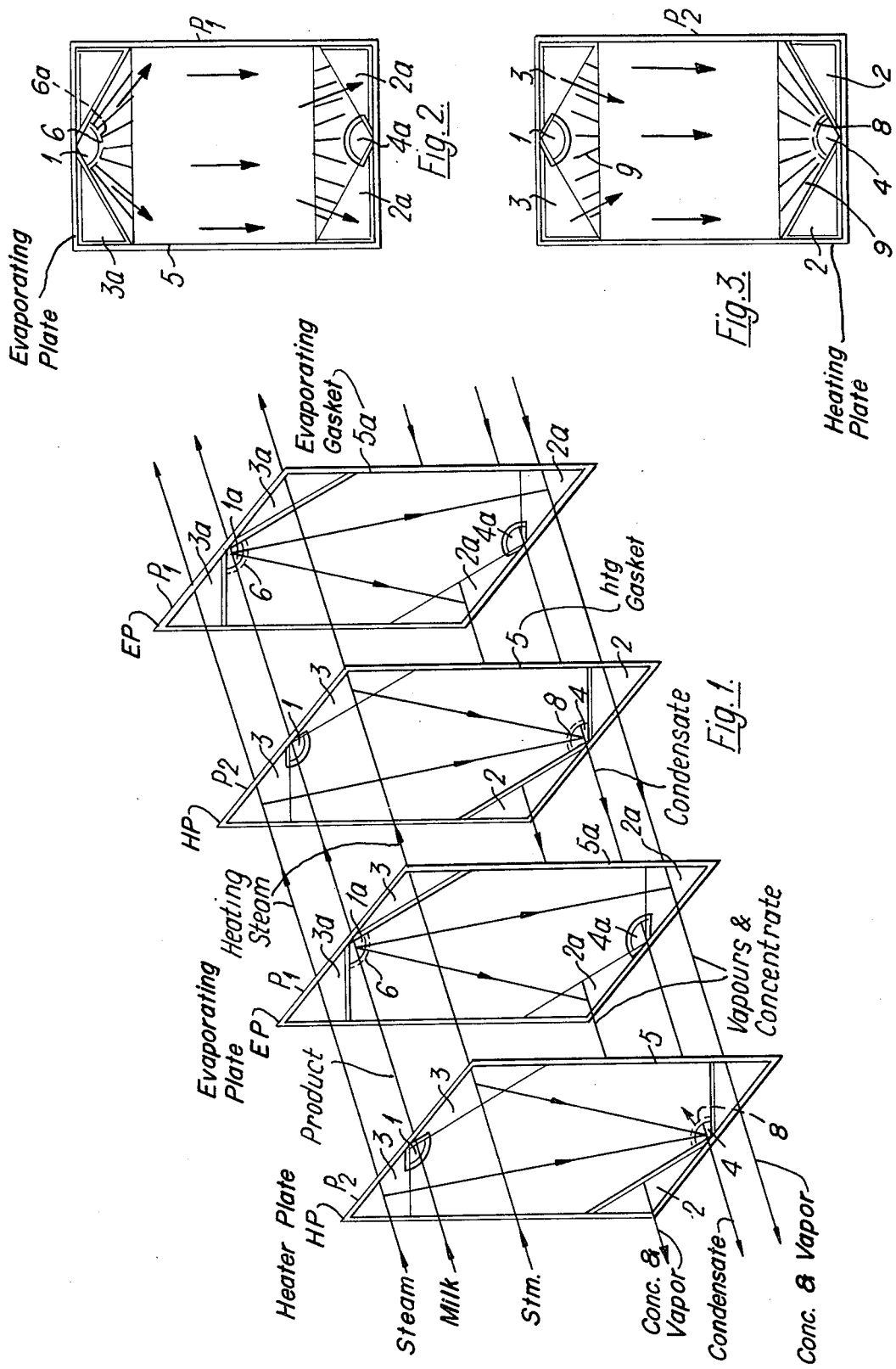

PLATE TYPE LIQUID HEATER & EVAPORATOR

The present invention concerns improvements in or relating to liquid heaters, especially heaters for the partial evaporation of the liquid within the heater to increase its concentration.

U.S. Pat. No. 3,399,708 shows a liquid heater consisting of parallel vertical and alternating evaporator and heater plates in tandem, which contain heating or liquid channels between adjoining plates, the plates having registering apertures for the heating medium, the product to be evaporated, the condensate and the mixture of concentrated liquid and vapours. Mounted on the evaporator plate preceding the associated heater plate are uptakes, whereas the evaporator plate behind this heater plate is provided with downtake. The heater plate also has an aperature connecting the uptakes and downtakes.

It is a drawback that one evaporator plate each is required for the uptakes and the downtakes. This doubles the number of plates. The doubling of the evaporator plates inevitably leads to comparatively unwieldy heater designs of large overall depth.

Moreover, in the known heater arrangement the liquid is deflected through 180° during the movement from uptake to downtake, the product thereby being unnecessarily stressed both thermally and mechanically, the immediate consequence being damage to the product. Inevitably, the pressure drop in the evaporator channel also increases.

The same considerations apply logically to the heating steam, which is repeatedly deflected on the heater plate.

Another object of the present invention is to provide a liquid heater in which the evaporator plate has a distribution system designed to distribute inflowing product to be evaporated in a uniform manner over the surface of the plate.

It is an object of the present invention to obviate or mitigate the disadvantages of prior heaters.

According to the present invention there is provided a liquid heater, especially for the partial evaporation of the liquid within the heater to increase its concentration, including evaporator and heater plates arranged in an alternating sequence in tandem with gaskets therebetween to provide and having heating or product channels between adjacent plates and the plates having registering apertures providing inlet and outlet for heating medium, an inlet for the product to be evaporated, and an inlet for the mixture consisting of concentrated liquid and vapours, each inlet aperture of the evaporator plate for the product having a distribution system comprising a series of orifices disposed angularly around the arcuate gasket, and a distribution zone on the plate adjacent the arcuate edge and formed by a series of upstanding mutually divergent guides on the plate providing between each adjacent pair of guides a flow channel, each orifice being disposed relative to a flow channel to direct a stream of product into the said flow channel whereby the angularly disposed orifices co-operate with the flow channels to produce a uniformly distributed film of product flowing from the distribution zone.

An embodiment of the present invention will now be described by way of example with reference to the accompanying purely diagrammatic drawings in which:

FIG. 1 is an exploded isometric representation of a liquid heater evaporator;

FIG. 2 is a view of an evaporator plate of the liquid heater evaporator shown in FIG. 1;

FIG. 3 is a view of a heater plate of the liquid heater evaporator shown in FIG. 1;

Figure 4:
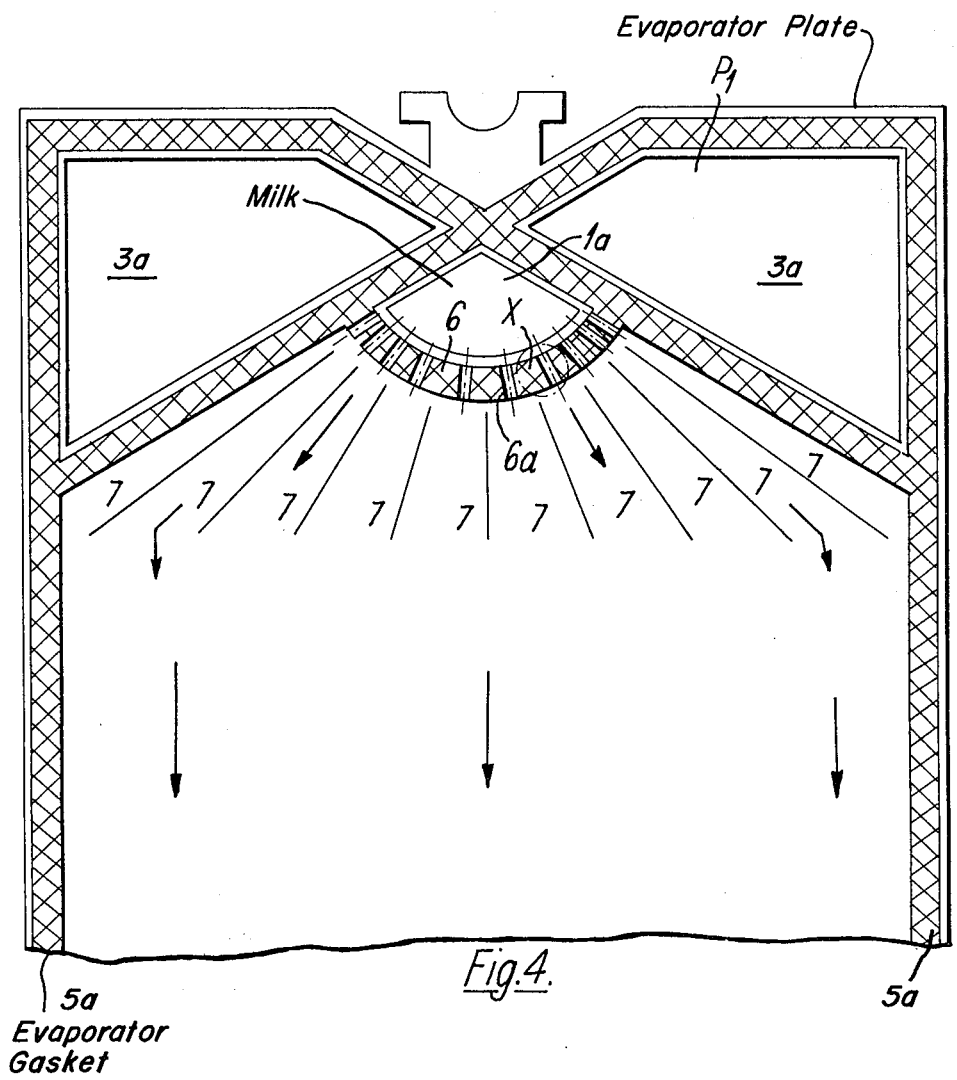
FIG. 4 is an enlarged part view of the evaporator plate shown in FIG. 2 with a gasket superpositioned thereon.

As may be seen from FIG. 1 of the drawings, the liquid heater consists of a stack of evaporator plates P1 and heater plates P2, arranged in an alternating sequence and suitably clamped together.

Each evaporator plate P1 and heater plate P2 have apertures 1a, 1 respectively for flow therethrough of the product to be evaporated, e.g. milk, and apertures 2a, 2 respectively for flow therethrough of the mixture consisting of concentrated liquid and vapour.

References 3a, 3 in the evaporating plates and heating plates, respectively identify apertures for the heating medium, suitably steam, while the condensate is discharged through apertures 4a, 4 respectively in the evaporating and heating plates.

Located between the evaporating plates P1 and heating plates P2 are the evaporator gaskets 5a and heating gaskets 5 respectively against which the respective plates P1, P2 are pressed together so as to form chambers between the plates in which the evaporating plate apertures 1a and 2a communicate with the liquid containing chamber via gasket 5a and the heating plate apertures 1, 4 communicate with the heating chamber via apertures in the heating gasket 5.

Figure 5:
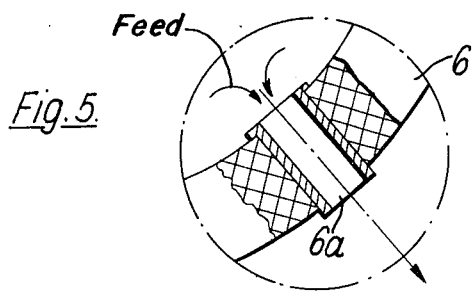
FIG. 5 is an enlarged view of the detail marked X in FIG. 4.

As may be seen from FIG. 1 of the drawings, each aperture 1a of the evaporator plate P1 has associated therewith a gasket distributor 6, which is a part-circular ring having an arcuate edge which has through passages 6a directed radially outwards and disposed angularly in the gasket (FIGS. 4 and 5).

The cross-sectional areas of the passages 6a can be of equal size, while their angular disposition is unequal, but one can also make the cross-sectional area of the passages 6a of unequal size and their angular disposition equal.

As is clearly shown by the drawing, the distributor 6 is part of each gasket 5a.

As is shown particularly by FIG. 4 of the drawings, there are upstanding mutually divergent guides 7 mounted on each evaporator plate P1, which uniformly distribute the product across the whole of the evaporator plate P1 and direct it to the apertures 2a at the corners of this plate P1. These guides 7 extend radially from close to the distributor 6.

Figure 6:
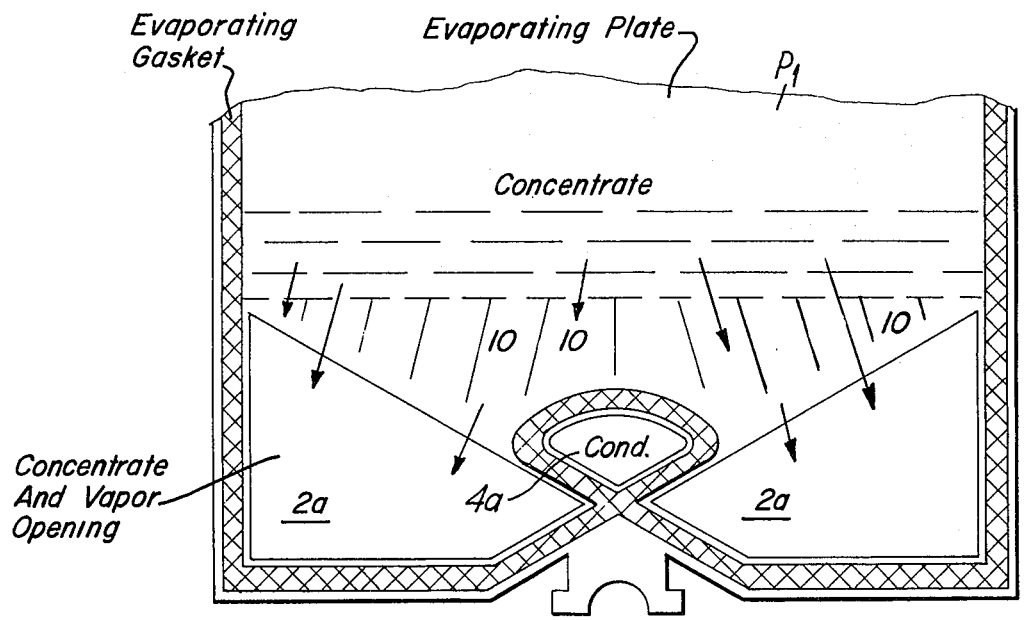
FIG. 6 is a view of another part of the evaporator plate shown in FIG. 2 with a gasket superpositioned thereon.
Figure 7:
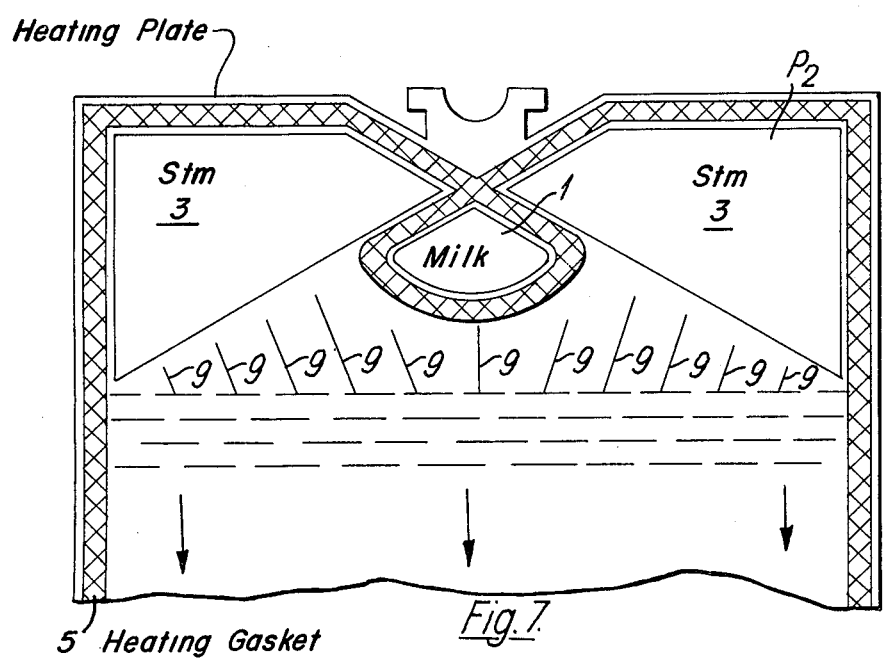
FIGS. 7 and 8 show two part views to different scales of the heater plate shown in FIG. 3 with a gasket superpositioned thereon.

Located in the lower part of the evaporator plate P1, FIG. 6, are guides 10 pointing in the direction of the two lateral apertures 2a for flow therethrough of the mixture consisting of concentrated liquid and vapour.

By virtue of the particular design of the distributor 6 and the arrangement of the guides 10, a uniform distribution of the product across the evaporator surface of plate P1 and hence a uniform increase in concentration is ensured.

As is clearly shown by FIG. 4, every two guides 7 form a channel, an orifice 6a being associated with each channel.

In the assembled condition of the heater these guides 7 also act as stiffeners for the evaporator plates P1 and the heater plates P2.

Figure 9:
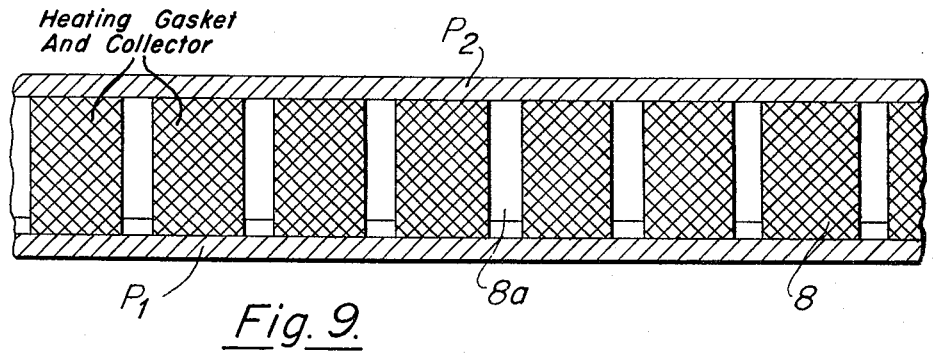
FIG. 9 is a development of a collector in the plate shown in FIG. 8.
Figure 8:
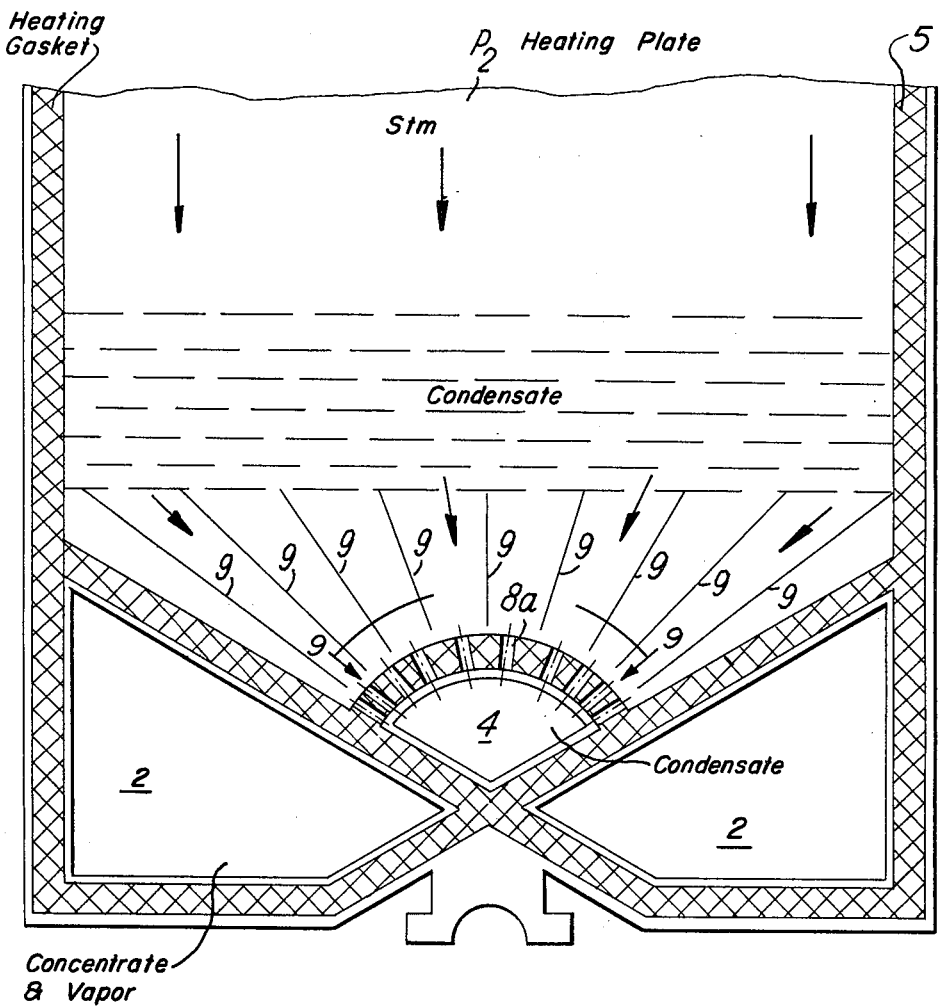

Arranged at the aperture 4 for the flow therethrough of condensate of from each heater plate P2 is a gasket collector 8 which preferably consists of a part-circular ring with radially converging slot-type apertures 8a (FIG. 8 and 9).

In the same way as on the evaporator plate P1, radially converging outstanding guides 9 are arranged on the heater plate P2, such as to collect the steam or the condensate uniformly across the whole volume of the heating chamber of the heaterplate P2 and eventually conduct the condensate in the lower part through the collector 8 to the aperture 4.

The method of operation of the liquid heater described above is as follows:

Heating medium, for example steam, enters through the apertures 3 into the heating channel of the heater plate P2. Due to the appropriate design of the gasket 5a in the area of the aperture 1a of the evaporator plate P1, the passage of the heating steam into this plate P1 is blocked.

The steam or the condensate therefrom flows along the guides 9 indicated in FIG. 3, the condensate being discharged through aperture 4 or 4a.

The product to be evaporated, e.g. milk, is conducted through aperture 1a to each evaporator plate P1 and flows, uniformly distributed, along the guides 7 downwards, by gravity (FIG. 2). In the course of this movement the liquid is at least partially evaporated, the concentrate and the vapours being discharged through apertures 2a or 2.

As a result of the design of the liquid heater of the embodiment described above only one downtake is required for evaporation, which is formed between a heater plate and an evaporator plate. This reduces the number of plates required for evaporation by half as compared with conventional liquid heaters. Moreover, the dwell specified by the distance to be covered is reduced by the same amount, since the liquid flows only through a single channel, namely the downtake.

The distributor also ensures a uniform distribution and an increase in concentration of the product along the evaporator plate. Consequently, the heat transmission area is fully utilized, any dead corners and local hot spots being avoided.

The reduction in area at the entry to the liquid channel causes a pressure head to be generated in front of the passages of the distributor, which enables equal volumes of the liquid to be evaporated to be transferred into the various evaporator channels.

I claim:

1. A liquid heater-evaporator (H-E) of the plate type especially for the partial evaporation of liquid within the H-E to increase its concentration, including parallel, equispaced evaporator plates (E-P) and heater plates (H-P) arranged in interdigitated sequence and in tandem with corresponding EP gaskets (EPG) and HP gaskets (HPG) therebetween to provide respective heating and liquid channels between adjacent plates, the plates and gaskets having registering openings therein providing respective and separate inlet and outlet paths for heating medium and liquid to be evaporated (LTBE), said openings comprising a feed inlet opening for the LTBE and an outlet opening for the mixture consisting of concentrated liquid and vapor in each EP and EPG; each feed inlet opening of each EPG lying in a medially located arcuate band at corresponding edges at the same ends of the EP's along which an arcuate portion of the gasket extends and each EPG arcuate portion having a distribution system comprising a series of radially directed orifices disposed around the portion and each EP having a distribution zone thereon comprising its said inlet opening of arcuate form corresponding to that of its gasket and a series of outstanding mutually divergent rib like guides thereon adjacent and downstream of the EPG arcuate portion providing a flow channel between each adjacent pair of guides, each orifice being disposed relative to a flow channel whereby the radially disposed orifices cooperate with the flow channels to produce a uniformly distributed film of liquid flowing from the distribution zone across the width of the EP.

2. A heater as claimed in claim 1, in which the cross-sectional area of the orifices are equal and their angular disposition is unequal.

3. A heater as claimed in claim 1, in which the cross-sectional area of the orifices are unequal and their angular disposition is equal.

4. A heater as claimed in claim 1, in which guides are provided in the lower area of the EP diverging in the direction of two laterally located outlet openings for the mixture consisting of concentrated liquid and vapours.

5. A heater as claimed in claim 1, in which the outstanding guides in the assembled condition of the H-E act as stiffeners for the EP'S and the HP'S.

6. A heater as claimed in claim 1, in which the outlet opening of each HP and its HPG has an arcuate edge, said HPG having slot-type radially converging apertures.

* * * * *